Patented Jan. 2, 1951

2,536,439

UNITED STATES PATENT OFFICE 2,536,439

FOOD PRODUCT AND METHOD OF PRODUCTION

William Peter Martin Grelck, Baltimore, Md.

No Drawing. Application January 19, 1949,
Serial No. 71,760

2 Claims. (Cl. 99—2)

My invention relates to a food product in granular form, containing the solid matter from fresh or lacto-fermented whey, dried buttermilk, and/or dried skim milk, semi-solid brewer's yeast made under my Patent Number 2,235,614, dated March 18, 1941, and salt.

One object of my invention is providing a method for producing a food product in granular form with a high content of the vitamins of the vitamin "B" complex, which is accomplished by the addition of semi-solid brewer's yeast containing the original vitamins of the water-soluble type unaltered and not partially denatured by high drying temperature. The semi-solid brewer's yeast contains an average of from 55 to 60 per cent moisture, dried whey, dried buttermilk as well as dried skim milk contain an average of 4 per cent moisture. There is a great demand for a granular food product made-up by a combination of non-fatty milk-byproducts solids together with semi-solid brewer's yeast on account of their high water-soluble vitamin and essential amino acid content, which are especially available in dried whey and semi-solid brewer's yeast in great abundance, but due to the high moisture content in semi-solid brewer's yeast the incorporation of it is limited to ten per cent to prevent hardening or caking, however by the addition of a proportionate quantity of salt, the quantity of semi-solid brewer's yeast may be increased to twenty per cent with the result that a stable and granular food product is obtained. The addition of salt prevents coalescence of the food particles in that the salt, first dissolved in the quantity of semi-solid brewer's yeast, crystallizes out in part, due to a dialytic effect which takes place during and after the mixing period when the low moisture ingredients absorb moisture from the high moisture ingredient (semi-solid brewer's yeast) to a point of equalization, part of the salt forms minute crystals, which permeate the whole mass and have the effect to prevent coalescence of the food particles, thereby causing the finished product to become stable and granular.

Therefore in my process coalescence of the food particles is prevented in the finished food product by means of the addition of a proportionate amount of salt in respect to the average moisture content. The amount of salt added is in excess to the amount of salt dissolved and I find that by replacing five per cent of the dried whey with salt the desired result, that of preventing coalescence of the food product particles is achieved. The minute salt crystals formed permeate the finished product and the result is a stable and granular food product.

The following is a detailed explanation of performing this invention:

*Example.*—To make one thousand pounds of this food product, I place two hundred pounds of semi-solid brewer's yeast in a suitable feed mixer and add fifty pounds of salt, mix the mass thoroughly, this is the first step in my process, the second step consists in adding slowly five hundred pounds of dried whey and two hundred fifty pounds of a mixture of dried buttermilk and dried skim milk to the mixture of semi-solid brewer's yeast and salt, intermingle all of the ingredients thoroughly until a fairly uniform mixture is obtained, then as the third step, the so processed food preparation is passed through a hammermill, fitted with or without a suitable screen for the purpose of giving the finished product uniformity and homogeneity. The moisture content averages fourteen per cent.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A method of producing a granular food product free from active crystals of sugar of milk which comprises the mixing of dry powdered whey as its principal ingredient with dry non-fatty milk solids together with semi-solid brewer's yeast and salt to a homogeneous granular mass.

2. A food product in granular form free from active crystals of sugar of milk, containing as its principal ingredients dried powdered whey together with dry non-fatty solids of milk and semi-solid brewer's yeast and salt.

WILLIAM PETER MARTIN GRELCK.

REFERENCES CITED

The following references are of record in the file of this patent:

UNITED STATES PATENTS

| Number | Name | Date |
| --- | --- | --- |
| 2,235,613 | Grelck | Mar. 18, 1941 |
| 2,279,106 | Brown | Apr. 7, 1942 |
| 2,450,318 | Wagamon | Sept. 28, 1948 |

FOREIGN PATENTS

| Number | Country | Date |
| --- | --- | --- |
| 232,667 | Great Britain | of 1925 |